United States Patent Office 3,531,810
Patented Oct. 6, 1970

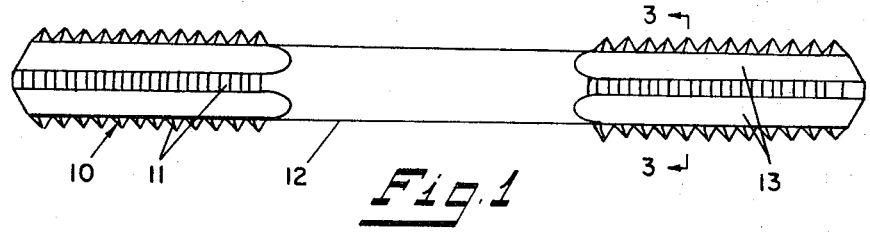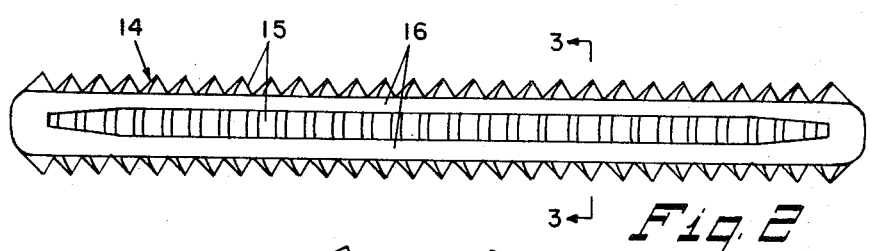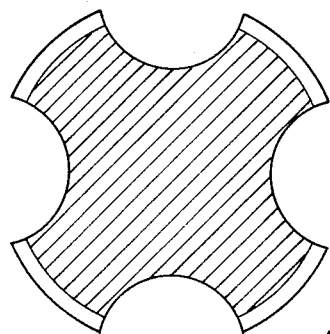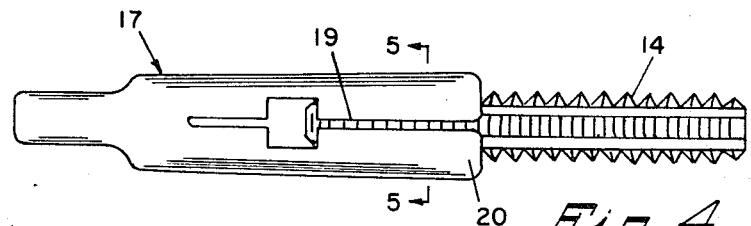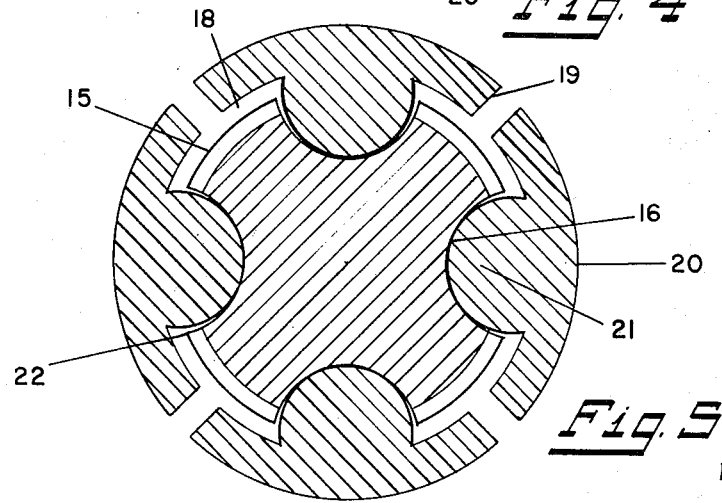

3,531,810
TAPPING TOOLS
Clarence J. Fure, Box 327, Cassville, Wis. 53806
Continuation-in-part of application Ser. No. 688,507, Dec. 6, 1967. This application Sept. 25, 1969, Ser. No. 861,020
Int. Cl. B23g 5/06, 5/14; B23b 31/00
U.S. Cl. 10—141
2 Claims

ABSTRACT OF THE DISCLOSURE

A tapping tool having a double ended tap with chip grooves extending between a plurality of ridges of cutting teeth, and a tap holder with longitudinally extending fingers having locking ridges formed on the inside thereof. The locking ridges engage the bottom of the chip grooves to maintain the tap concentrically within the holder while maintaining cutting teeth in spaced relation with the wall of the holder.

RELATED APPLICATION

This application is a continuation-in-part of my copending U.S. patent application Ser. No. 688,507, now abandoned.

BACKGROUND OF THE INVENTION

The field of the invention is tapping tools. The closest known art is U.S. Pat. No. 2,424,113 showing a tapping tool comprising a tap and holder. However, in said patent, and all other known art, the ridges of cutting teeth on the tap engage the holder and are therefore subject to damage thereby.

SUMMARY OF THE INVENTION

Basically, my invention is a tapping tool comprising a double ended tap and tubular holder therefor wherein the holder has substantially longitudinally extending fingers with inwardly protruding locking ridges engaged in the chip grooves of the tap. The tap is thus maintained in the holder with the cutting teeth held in spaced relation with the inside of the tubular holder thereby preventing the dulling or otherwise damaging of the cutting teeth in the holder.

Further objects, features and advantages of my invention will be apparent from the following detailed description taken in conjunction with the accompanying drawings.

BRIEF DESCRIPTION OF THE DRAWINGS

FIG. 1 is a side view of a double ended tap in accordance with my invention;

FIG. 2 is a side view of a second embodiment of a double ended tap;

FIG. 3 is a section view taken along line 3—3 in either FIG. 1 or 2;

FIG. 4 is a side view of a tapping tool comprising a double ended tap and holder therefor in accordance with my invention;

FIG. 5 is a cross-sectional view taken along line 5—5 of FIG. 4.

DETAILED DESCRIPTION OF PREFERRED EMBODIMENT

Referring now more particularly to the drawings wherein like numerals refer to like parts throughout the several views, FIG. 1 shows an elongate double ended tap 10 having substantially longitudinally extending ridges of cutting teeth 11 formed on each end thereof with and being connected by an intermediate shaft portion 12. A plurality of longitudinal chip grooves 13 extend between the ridges of cutting teeth for receiving material cut by the teeth.

The use of double ended taps has become prevalent because they may be used twice as long as single ended taps since both ends can be utilized before the tap needs to be discarded or resharpened.

FIG. 2 shows a second tap 14 wherein the ridges of cutting teeth 15 and interleaved chip grooves 16 extend the full length of the tap to facilitate economical manufacture.

As shown in FIG. 3, the cross-sections of both taps 10 and 14 are identical. The chip grooves as shown preferably have substantially the cross-sectional configuration of a section of circle.

FIGS. 4 and 5 show my tapping tool comprising a holder 17 and the tap 14. The holder 17 comprises a body having standard Morris taper shape and having a central recess 18 formed in the larger end thereof for receiving one end of the double-ended tap. The holder is slit as shown at 19 to provide fingers 20 forming the wall of the recess. The wall of the recess is contracted when the tap holder is secured in the usual taper socket.

As best shown in FIG. 5, each of the holder fingers 20 has a longitudinally extending locking ridge 21 formed on the inside thereof so as to protrude laterally into the central recess 18 of the holder. Each of the locking ridges extends into and engages the bottom of one of the chip grooves 16 to maintain the tap concentrically within the holder with the ridges of cutting teeth held in spaced relation with the wall of the recess of the holder.

FIG. 5 shows that the locking ridges 21 have substantially the same cross-sectional configuration as the bottom of the chip grooves 16, except that the outer edges of the chip grooves are spaced slightly from the locking ridges whereby the edges 22 of the crests of the ridges of cutting teeth are spaced slightly from the locking ridges to prevent dulling of the edges of the cutting teeth.

What is claimed is:
1. A tapping tool comprising:
 (a) an elongate double ended tap,
  (1) a plurality of substantially equally spaced ridges of cutting teeth extending along the direction of elongation of said tap, and
  (2) a like plurality of longitudinally extending chip grooves formed between said ridges of cutting teeth; and
 (b) a tap holder having a central recess receiving one end of said tap therein,
  (1) a plurality of fingers formed by longitudinally extending slits in said tap holder, and
  (2) each of said fingers having a longitudinally extending locking ridge fixed integrally on the inside thereof and protruding laterally into said recess and engaging the bottom of one of said chip grooves to hold said tap concentrically within said holder and maintaining said ridges of cutting teeth in spaced relation with said holder along the entire length of said tap.
2. The tapping tool as specified in claim 1 wherein the edges of the crest of said cutting teeth are spaced from said locking ridges.

References Cited

UNITED STATES PATENTS

| | | | |
|---|---|---|---|
| 412,952 | 10/1889 | Elterich | 10—141 |
| 1,376,384 | 4/1921 | Logan | 10—141 |
| 2,424,113 | 7/1947 | Norberg et al. | 10—141 |

CHARLES W. LANHAM, Primary Examiner

E. M. COMBS, Assistant Examiner